(No Model.)
M. A. LEVY.
CABINET FOR DUPLICATING APPARATUS OR SLABS.
No. 427,518. Patented May 6, 1890.
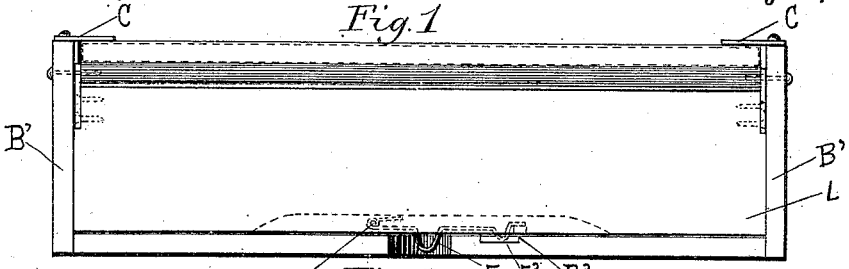
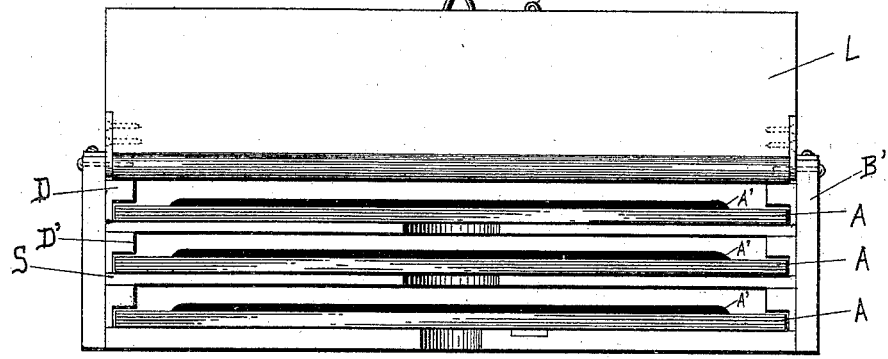
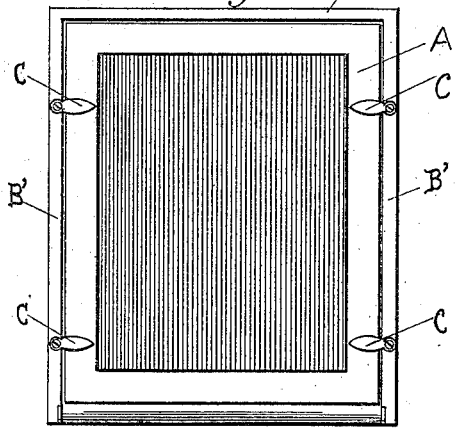
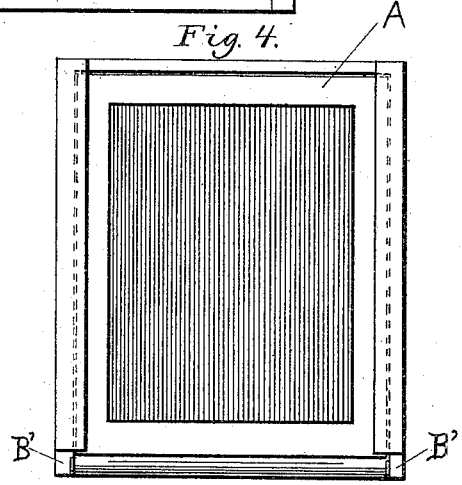
Witnesses
W. H. Hyatt.
L. S. Anderson.
Inventor:
Marc Asher Levy,
per G. Hewlett Davis,
Attorney

UNITED STATES PATENT OFFICE.

MARC ASHER LEVY, OF NEW YORK, N. Y., ASSIGNOR TO THE GENERAL COPYING APPARATUS COMPANY, OF SAME PLACE.

CABINET FOR DUPLICATING APPARATUS OR SLABS.

SPECIFICATION forming part of Letters Patent No. 427,518, dated May 6, 1890.

Application filed January 31, 1890. Serial No. 338,827. (No model.)

*To all whom it may concern:*

Be it known that I, MARC ASHER LEVY, a subject of the Queen of Great Britain, residing at New York city, in the county of New York and State of New York, have invented certain new and useful Improvements in a Cabinet for Duplicating Apparatus or Slabs; and I do hereby declare the following to be a full, clear, and exact description of the invention, such as will enable others skilled in the art to which it appertains to make and use the same.

My invention has for its object to provide a simple, practical, and inexpensive cabinet for duplicating apparatus or slabs, the use of which renders the operation of said apparatus decidedly more easy and convenient, and provides means for safely storing the apparatus away when not in use.

In operating any of the duplicating apparatus, the printing-surface of which is composed of gelatine or other analogous material, there is a tendency to lift the apparatus from the table whenever a printed sheet is being removed, owing to suction or adhesion, and unless the apparatus is held with one hand while the sheet is being removed with the other the apparatus, if not actually lifted from the table, is caused to move or slide around considerably, which trouble is wholly avoided by the employment of my improvements.

In the accompanying drawings, Figure 1 represents an end view of my cabinet with the lid closed. Fig. 2 represents a similar view with the lid opened. Fig. 3 is a top view of my improvement, showing a duplicating apparatus or slab held in position thereon. Fig. 4 is a top view of a modification of my improvement. Fig. 5 is a sectional view showing the construction illustrated by Figs. 1, 2, and 3, cut through from end to end.

Similar letters of reference indicate like parts throughout the several views.

A represents a duplicating apparatus or slab such as is claimed in a patent issued to me October 8, 1889, No. 412,635.

The two sides $B'$ and the end $B^2$ of my cabinet are extended a slight distance above the cover or top of the cabinet, so that when the slab A is placed on top of the cabinet the extended sides and end help to keep it in position. The clasps C are pivotally attached to the sides $B'$ by means of screws, as shown. The slab A is held rigidly in position by turning the clasps C, so as to engage its outer edges or borders, and by turning the clasps outward the slab can readily be removed.

After the apparatus or slab has been used it is removed from the top of the cabinet and slid within the same on one of the shelves S. The shelves S are supported and held in position by the right-angled strips D, which are glued or screwed to the sides $B'$ and extend the whole length thereof. The strips D not only serve to hold the shelves S in position, but the flange $D'$, with the shelf S, forms a groove for receiving the sides or edges of the slab A. The bottoms of the slabs are thus allowed to rest flat upon the shelves S, thus preventing them from becoming bent out of shape or warped, and the upper surface $A'$, made of gelatine or other such destructible material, is prevented from being rubbed or destroyed from coming in contact with the shelf above it, owing to the flange $D'$, which engages the edges of the slab.

The lid L is preferably hinged to the top of the cabinet, as shown. The spring-latch E, of the shape shown, is made of wire and is inserted in a deep longitudinal slot made in the lid, and is secured therein by means of a pivot or screw $E'$, around which the wire forming the latch is bent. Upon the lid being closed the projection $E^2$ strikes and slides over a small metal piece $B^3$. In order to open the lid, the latch is pressed upward at the point E, which disengages the projection $E^2$ and allows the lid to open.

Instead of having the lid hinged as shown and described, it can be made to slide in grooves made in the top and bottom of cabinet at the open end, and such a modification would not in any way avoid the spirit of my invention, especially since I have already made cabinets the lids of which are made to slide into the same, as just described.

At Fig. 4 is shown a modification of my cabinet, wherein, instead of employing the clasps C, the top of the sides $B'$ are made to project inward, so as to engage the outer edges of apparatus. In this latter construction the apparatus must be slid into the grooves formed by the projecting edges of the sides B′, whereas in the construction shown by Figs. 1, 2, and 3, the slab can be laid directly on top of the cabinet, and afterward secured thereon by simply turning the clasps C inward. The clasps C can be made rigid; but this would necessitate sliding the apparatus under them.

In using the apparatus hereinbefore mentioned as having been patented by me, and also such other apparatus as the hectograph, &c., it is necessary when much work is to be done to have a number of slabs on hand, so that when one is being used the other can be absorbing the last impression or be washed off, (which latter is necessary with the hectograph,) and in this connection my cabinet especially commends itself, as it not only elevates the slab to a convenient height for printing and prevents it from sliding around or lifting up, but it also provides convenient receptacles for those not in use, or which have just been used, and prevents the printing-surfaces thereof from becoming damaged, and when the lid is closed dust and other foreign substances are excluded.

By making the body of the duplicating-slab A sufficiently stiff or rigid the shelves S can be dispensed with and the slabs simply slid into grooves formed at either side of the cabinet, and instead of employing separate strips D for forming the grooves the grooves for both the shelves and the slab can be formed in the same piece with the sides B′.

Another important advantage of my cabinet is that it makes a most desirable shipping-box, preventing the delicate printing-surfaces of the slabs from becoming the least damaged, and it is obvious that the use of my cabinet for such purpose saves considerable expense.

What I claim is—

1. The combination, with a duplicating-slab such as described, of a cabinet therefor provided with suitable means upon its top or cover for holding a duplicating-slab in position thereon and provided with a receptacle below said cover for receiving said slab, substantially as shown and described.

2. The combination, with duplicating-slabs such as described, of a cabinet having two or more of its sides extended above its top or cover and provided with shelves with side grooves below said cover, substantially as shown and described.

3. The combination, with duplicating-slabs such as described, of a cabinet having two or more of its sides extended above its top or cover, having a suitable lid at its open end and provided with shelves below said cover, substantially as shown and described.

In testimony whereof I affix my signature in presence of two witnesses.

MARC ASHER LEVY.

Witnesses:
S. K. LICHTENSTEIN,
G. H. DAVIS.